H. H. KNOTT, C. J. JUNGBLUTH AND E. B. HAMMER.
PROCESS FOR MAKING PEARL BUTTON BLANKS.
APPLICATION FILED JAN. 2, 1917.
1,315,673.
Patented Sept. 9, 1919.
3 SHEETS—SHEET 1.
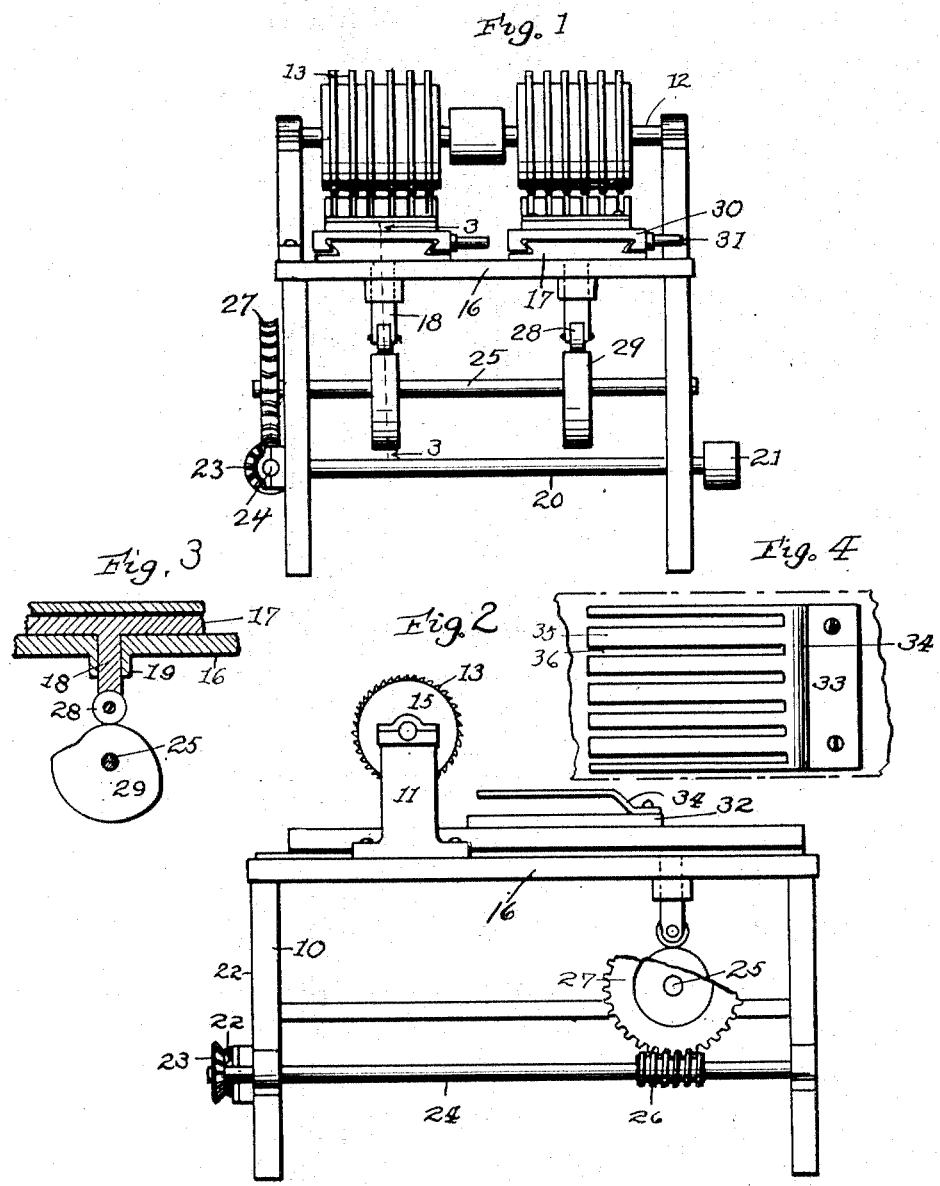
Inventor
H. H. Knott, C. J. Jungbluth
E. B. Hammer
By Drury & Bair
Attys

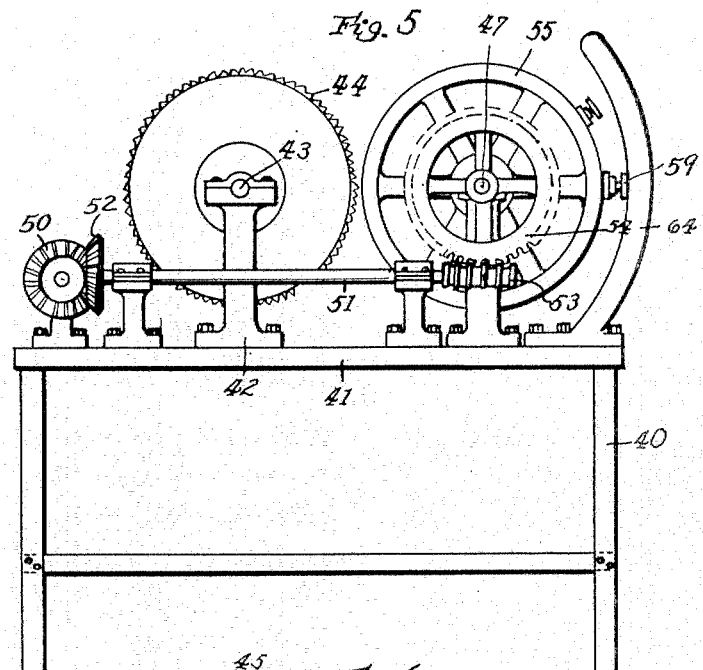
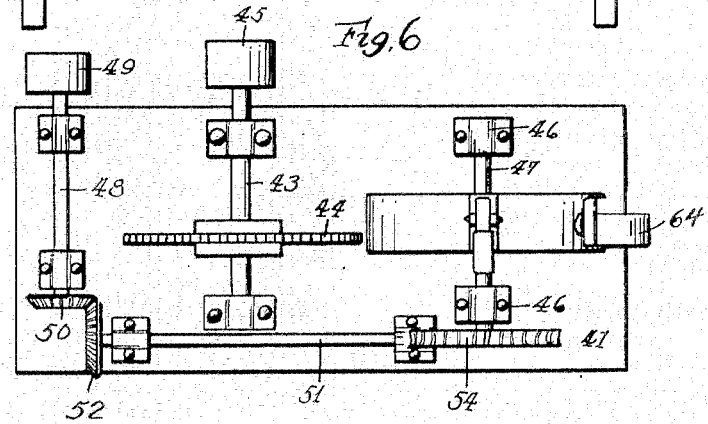
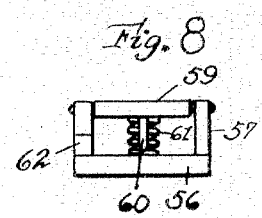
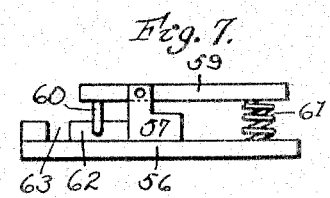

H. H. KNOTT, C. J. JUNGBLUTH AND E. B. HAMMER.
PROCESS FOR MAKING PEARL BUTTON BLANKS.
APPLICATION FILED JAN. 2, 1917.
1,315,673.
Patented Sept. 9, 1919.
3 SHEETS—SHEET 3.
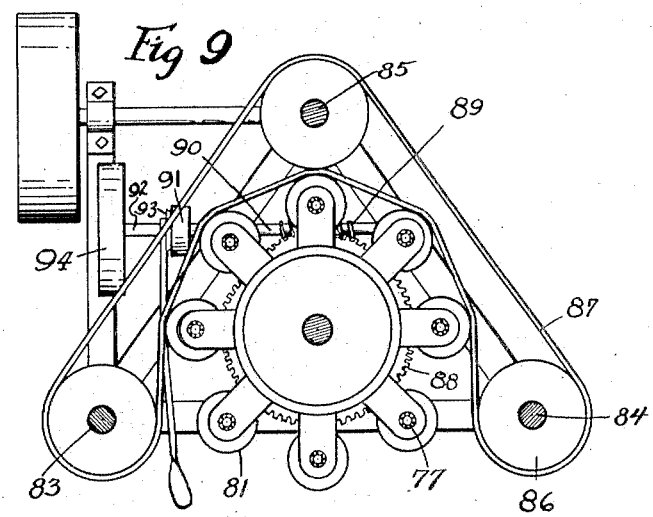
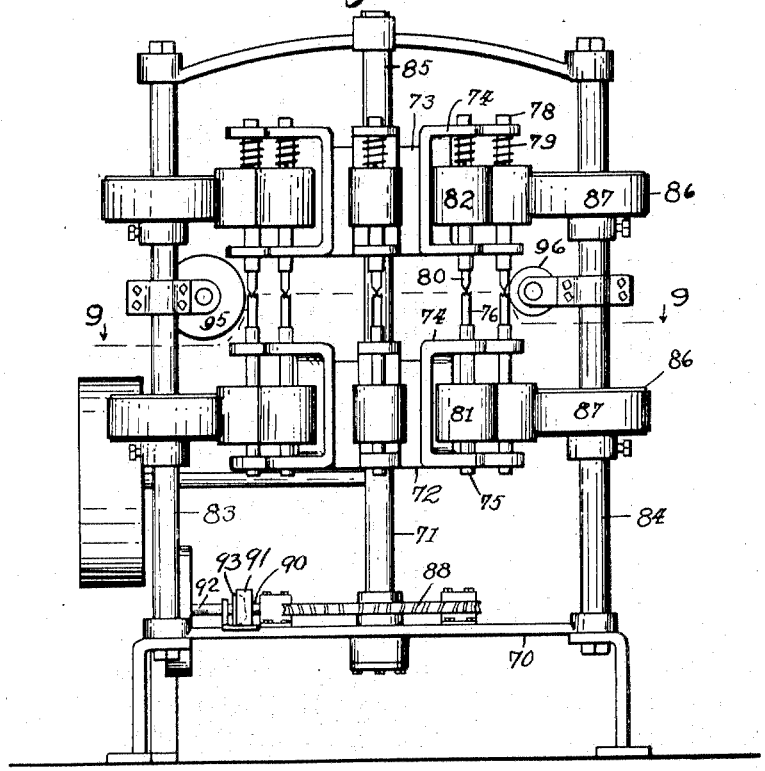

UNITED STATES PATENT OFFICE.

HARRY H. KNOTT, CARL J. JUNGBLUTH, AND EDWIN B. HAMMER, OF WASHINGTON, IOWA.

PROCESS FOR MAKING PEARL BUTTON-BLANKS.

1,315,673.      Specification of Letters Patent.      Patented Sept. 9, 1919.

Application filed January 2, 1917. Serial No. 140,179.

*To all whom it may concern:*

Be it known that we, HARRY H. KNOTT, CARL J. JUNGBLUTH, and EDWIN B. HAMMER, citizens of the United States, and residents of Washington, in the county of Washington and State of Iowa, have invented a certain new and useful Process for Making Pearl Button-Blanks, of which the following is a specification.

The object of our invention is to provide a simple and efficient process for making pearl button blanks in the shape of a round disk, by which process forty to one hundred per cent. more blanks may be secured from a shell than has been heretofore possible, and by which the cost of producing suitable button blanks is greatly reduced, and by which more perfect and uniform buttons may be made.

In practice of such process we first cut the shell into strips on parallel lines, and then cut such strips for making blanks of angular outline.

The blanks thus made, which are preferably square, and then rounded in any suitable way, preferably by holding them between two gripping members, one being pointed and the other arranged to engage one side of the blank over a considerable area and rotating both gripping members uniformly, and subjecting the blank to contact with a frictional grinding device.

In order to properly set forth the steps and advantages of our process, a brief explanation will be made of the prior process of manufacturing pearl button blanks.

In the prior process, a machine is employed having a wooden block and having opposite said block a tubular saw in the form of a slightly tapered cylinder, having teeth formed on one end.

This saw is mounted in a mandrel which rotates. By means of a screw feed the wooden plug is brought toward the saw thus forcing the shell against the rotating saw.

The shells are of irregular shape and are held by workmen with tongs which grip the opposite edges of the shell.

The workman holds the shell with its back against the wooden block and slides the shell toward the saw and thereby saws out a round disk or blank.

The workman then allows the shell and plug to slide away from the saw and shifts the shell to another position and then saws out another blank. This operation is continued as long as the workman can find space on the shell to place his tubular saw. This process involves a great waste of material for several reasons.

In the first place, the peculiar shape of the shell is such that the curved portions, near the edges, cannot be utilized. Neither can the hinge portions of the shells be used.

The curved portions break too easily to be sawed up close to the edge of the shell, and the tubular saw cannot be used for cutting blanks from the hinge portion of the shell, for the reason that the saws are frequently broken in the attempt.

Cutting the blank by forcing the shell against the saw takes considerable pressure, and as the shells are brittle, the blank often times breaks out before the saw has cut through, which results in imperfect blanks having projections or "wings" on the sides, or some times a piece is broken off the blank which leaves it irregular in outline and worthless.

The tongs used comprise two channel-shaped members which extend from the edges of the shell in such a way that access with the saw cannot be had to those portions of the shells covered by the tongs, and this results in another loss of material.

Owing to the peculiar shape of the shell and the difficulty in holding and adjusting the shell for sawing, it is necessary to employ highly skilled workmen for cutting the blanks, making this part of the process of manufacture expensive.

Owing to the fact that the surfaces of the shells are so irregular in shape, it is necessary to use a comparatively soft saw. A high-tempered saw breaks. The use of a soft-tempered saw of the kind commonly used means that almost fifty per cent. of the cutter's time is spent in filing, setting and adjusting his saw.

The use of the tapered tubular saw results in the cutting of blanks which are not of strictly uniform size. No two workmen will set the teeth of their saws exactly the same, which causes variation in size of the blanks cut with the saws.

The method of cutting blanks just described, has been used for many years in the button industry, and applicants, who have been engaged for years in the business do not know of any other method heretofore in use for cutting out the button blanks.

We have designed the practice of our method for various shells, particularly for use with fresh water shells, which vary considerably in size and shape.

The problem involved is very largely due to the irregular shape of the shells, and to their brittle nature.

In the practice of our process, we preferably place the shell on a block or movable member on which it is held in any suitable way, and move the shell to position where a plurality of circular saws cut shells into strips preferably crosswise of shell. The strips are then subjected to contact with another saw or saws, cutting preferably at right angles to the first cut, thus making blanks of angular outline, preferably square.

Other mechanism may be used for carrying out our process, for instance a plurality of saws may be used for cutting into the shell for a short distance, and then the shell may be cut across the lines of the first series of cuts, for cutting angular blanks.

This portion of the process we consider important, although it may not be the only way in which the process could be carried out, for the reason that the shells are difficult to hold on account of their peculiar shapes and on account of their brittle nature.

The blanks as thus formed are then rounded into circular disks, in some suitable way. Various mechanisms may be employed, but we preferably secure each blank between gripping members, both of which revolve, one of which is pointed and is adapted to engage the center of the blank, thus forming a center around which the square disk revolves, and the other of which is adapted to engage the opposite side of a blank over a considerable area.

The second gripping member may be a tubular member having teeth at its ends, or a solid member with corrugated or rough surface to give greatest gripping power on disk.

Both gripping members are simultaneously revolved at the same speed and the blank is subjected to contact with an emery wheel or other abrasive device until the blank is made into a round disk.

Both gripping members must preferably be rotated simultaneously; otherwise the gripping member which did not move would bore into the blank which is brittle and frail.

The disks are then ready to be made into buttons in the ordinary way.

For the purpose of more clearly illustrating the method of practising our process we have shown herewith certain forms of machines by which the process may be carried on.

We desire to have it understood, however, that different kinds of machines may be used for the purpose, and that the kind of machine is not vital to the proper use of the process.

In the accompanying drawings illustrating machines whereby our process may be carried out—

Figure 1 shows a front elevation of a machine by which the shells are cut on certain lines by placing them on a suitable support and moving the support toward proper saws.

Fig. 2 shows a side elevation of the same.

Fig. 3 shows a detail sectional view taken on the line 3—3 of Fig. 1.

Fig. 4 shows a detail view of one of the devices for holding shell.

Fig. 5 shows a side elevation of a machine by which the shell may be sawed on lines into angular blanks.

Fig. 6 shows a top or plan view of the machine shown in Fig. 5.

Figs. 7 and 8 show detail view of the device which grips the shell strips.

Fig. 9 shows a horizontal sectional view of the machine by which the blanks are gripped between the gripping members substantially at their centers and other members engaging the shell blanks over a considerable portion of their central areas and by which both gripping members are simultaneously rotated and the blanks subjected to frictional abrasion for making the blanks into round disks, taken on the line 9—9 of Fig. 10; and Fig. 10 shows a front elevation of the machine shown in Fig. 9;

In the accompanying drawings we have used the reference numeral 10 to indicate generally the frame of the machine for cutting the shells on certain lines.

Mounted on the frame 10 are upwardly extending supports 11 in which there is rotatably mounted a shaft 12. On the shaft 12 are a series of saws 13. In the drawings we have shown two series of such saws.

On the shaft 12 between the two series is a belt pulley 14 through which motion may be transmitted to the shaft 12 and the saws 13.

The saws 13 comprise comparatively narrow blades which are mounted on cylinders 15. At the upper end of the frame 10 is a platform 16. Above the platform 16 is a vertically movable member 17 having a downwardly extending member 18 slidably received in a bearing 19 on the platform 16. The device which we are now describing is the shell holding means, and one of such holding means is provided for each series of saws. The shell holding means are similar in construction and only one need be described.

The movable member 17 is vertically movable and its vertical movement is affected in the following manner.

Mounted on the frame 10 is a transverse shaft 20 on one end of which is a pulley 21 through which rotation may be transmitted to the shaft 20 and on the other end of which is a beveled gear 22. The beveled gear 22 meshes with a beveled gear 23 on a shaft 24 arranged longitudinally in the machine. Another transverse shaft 25 is arranged forwardly of and above the shaft 20 and above the shaft 24, as shown in Fig. 2.

On the shaft 24 is a worm 26 and on the shaft 25 is a worm gear 27.

On the lower ends of the members 18 are rollers 28 which engage cams 29 on the shaft 25. The shaft 25 is slowly rotated and it will be seen that it alternately raises and lowers the movable member 17.

Mounted on the movable member 17 to slide longitudinally in the machine is a second movable member 30 on which is an operating handle 31 by which the movable member 30 may be slid longitudinally in the machine.

On the member 30 is a plate 32 to which is secured a transverse metal plate 33, which, at one end, has an upwardly extending portion 34 on which are formed spaced rearwardly projecting fingers or strips 35.

Between the strips 35 are slots 36 to receive the saws when the movable member 30 is slid rearwardly in the machine to bring the shells in contact with the saws, or to position below the saws.

In the practical use of this part of the machine, the operator slips the shell under the strips 35 on the plate 32, grasps the handle 31 and shoves the movable member 30 rearwardly in the machine until the shell is below the saws.

The sliding movement can be so timed with relation to the action of the cam 29 as to move the movable members to position for holding the shell beneath the saws while the movable members are in their lowered position, so that after they have reached such position the operation of the cam 29 will serve to raise the movable members carrying with them the shell for causing the shell to be lifted into the path of the saws 13.

It will, of course, be understood that the parts are so arranged that the saws almost touch the plate 32 when the movable members are raised.

After the sawing operation has been completed, the movable member 30 is withdrawn and the shell strips are removed.

The shell strips are then cut into squares by means of the machine shown in Figs. 5, 6, 7 and 8 in which the reference numeral 40 indicates a frame.

At the upper end of the frame 40 is a table or platform 41. Extending upwardly from the table 41 are bearings 42 in which is mounted a transverse shaft 43. On the shaft 43 is a saw 44.

On the shaft 43 is also a belt pulley 45 by means of which rotation may be transmitted to the shaft 43.

On the table 41 are bearings 46 which support another shaft 47. Rotation is imparted to the shaft 47 in the following way.

Suitably mounted on the table 40 is a third shaft 48 having on one end a belt pulley 49, and on the other end a beveled gear 50.

A fourth shaft 51 is mounted in suitable bearings and has on one end a beveled gear 52 which meshes with a beveled gear 50. On the shaft 51 is a worm 53 which meshes with a worm gear 54 on the shaft 47. On the shaft 47 is a rotary member 55 to which are secured a plurality of shell holding members, two only of which are shown in the drawings.

These shell holding members comprise in each case a base 56 on which is a support 57 on which is pivoted an arm 59. At one end the arm 59 has a pin 60 extending toward the base 56, and at the other end the arm 56 is connected with the base 56 by a compression spring 61 which normally tends to hold the pin 60 immediately adjacent to the base 56.

On the base 56 is a flange 62 in which is a notch 63 to receive the saw.

On the table 41 is an upwardly extending guide device 64 so arranged and so curved on its face adjacent to the rotary member 55, that when the rotary member 55 is moved, the arm 59 will be engaged by the guide 64 for pressing the spring 61 and moving the pin 60 away from the base 56.

While the pin 60 is held away from the base 56, the strip or shell is placed between said pin and said base, and as the member 55 rotates, the shape of the guide 64 is such as to permit the spring 61 to expand for causing the pin 60 to engage the shell strip and hold it against the base 56.

It will be understood that the movement of the member 55 is quite slow. The shell strip held in the shell strip holding member is cut by the saw 44, and on the next rotation past the guide 64 may be moved to position for cutting off another button blank.

This process of moving the shell strip to different positions with relation to the notch 63 is continued until the shell strip is cut up into blanks.

The angular blanks are then rounded on the machine shown in Figs. 9 and 10, in which the reference numeral 70 indicates the frame, which supports an upright shaft 71. On the shaft 71 are mounted two spiders 72 and 73. Each of the spiders has a plurality of outwardly opening yokes 74. The yokes of the respective spiders are arranged in pairs one above the other.

Mounted in the lower yoke 74 are hollow shafts 75 which carry in their upper ends the hollow cylindrical engaging members 76, the uppers ends of which are toothed or corrugated as at 77 in Fig. 9, for engaging a considerable area of the button blank.

Mounted in the upper yoke 75 are hollow shafts 78 which are capable of limited sliding movement, and also of rotary movement, and are held at their lower limits of movement by springs 79.

Mounted in the lower ends of the cylindrical shafts 78 are pins 80 designed to coact with the engaging members 76 for holding button blanks.

On the shafts 75 and 78 are pulleys 81 and 82 respectively. Mounted on suitable shafts 83, 84 and 85 are spaced pairs of pulleys 86. The upper pulleys 86 are arranged in horizontal alinement with each other and also the lower series of pulleys 86 are arranged in horizontal alinement.

On each series of pulleys 86 is a belt 87 which extends around the pulleys and thence around part of the pulleys 81 or 82 as the case may be, as illustrated in Fig. 9, so that the pulleys 81 and 82 and the shafts on which said pulleys are mounted are rotated during part of the rotation of the shaft 71. The shaft 71 is rotated by means of a worm gear 88 thereon, which meshes with a worm 89 on a shaft 90 on one end of which is a clutch member 91.

Alined with the shaft 90 is a shaft 92 on which is a coacting sliding clutch member 93. Rotation is imparted to the shaft 92 from the belt pulley 94.

In the operation of the machine shown in Figs. 9 and 10 the operator may manually lift the shafts 78 against the pressure of the springs 79 when the pulleys 82 are out of contact with the belt 87 and place a button blank between the members 76 and 80.

The pulleys 82 and 81 which are subjected to the action of the belts 87 are rotated and said pulleys are subjected to the action of said belts because of the rotation of the shaft 21.

Suitably mounted on the machine are abrasion devices 95 and 96, which extend into the path of travel of the button blanks, so that as the buttons are whirled they are drawn to position so that their corners contact with the abrasion device 95 and with the device 96 and the corners are ground off thereby completing the process. The devices 95 and 96 may be of different material or different roughness of engaging surface or different sizes.

The practice of our process in the making of button blanks from fresh water shells has a number of important advantages.

In the first place by cutting the shells into blanks of square or other angular outline, we are able to make from forty to one hundred per cent. more blanks from a shell than by the old process, thus effecting a big saving of material.

Fresh water shells are becoming scarce and more expensive each year, as evidenced, for instance, by the efforts of the United States Government to increase their propagation, so that the production of forty to one hundred per cent. more blanks from each shell is of extreme importance in the button manufacturing business.

The process herein sought to be patented reduces the expense of manufacture very considerably.

The cutters save almost fifty per cent. of their time, which would otherwise be spent in preparing and adjusting their saws.

The old method requires care and time in adjusting each shell for cutting each blank, whereas, under the new method, the workman can saw the shell into squares very rapidly.

We thereby reduce the expense of labor on account of the fact that workmen produce nearly twice as much work in the same time.

We further reduce the expense of manufacture insomuch as the shells may be cut into squares, and the squares rounded in less time than the disks can be cut out by the old method.

Under the old method of sawing through the shell with a tubular saw, owing to the nature of the saw and the irregular shape of the shell, there is considerable loss due to the fact that the blanks break or split off. This loss is practically all avoided by the use of our improved process.

Under the old system comparatively soft metal saws must be used, while under the new system high-tempered saws may be employed so that less attention need be given to the saws, and less time used for their care.

Where our process is used, the blanks can be made of absolutely the same diameter by properly adjusting the gripping members with relation to the abrasive means. This means that the buttons produced will look better and be of greater value because of their uniform size.

In summary, then, we gain by our process from forty to one hundred per cent. more blanks from the same quantity of shell than under the old method.

We are able to produce button blanks at a smaller manufacturing cost on account of the saving of material and expense of labor, doing away with the care of the small tubular saws, and we also effect a further saving in that the buttons do not split off from the shell and do not have parts split from them as they do when sawed with a tubular saw.

We also are able to produce blanks of uniform diameter without the destruction attending the old method, which required severe pressure in cutting the blanks and which is absent in our method.

Our process may be carried out with a variety of machines, but we preferably use machines operating substantially as above described.

We claim as our invention:

The process of making pearl button blanks from shells, comprising the placing of shells on a suitable support, the moving of said support toward operating saws for cutting the shell on certain lines, the sawing of the shell on other lines to cut it into angular blanks, the gripping of the blanks between a pointed gripping member engaging the blanks substantially at their centers, and another member engaging the blanks over a considerable portion of their central areas, the simultaneous rotation of both gripping members, and the subjection of the edges of the blanks to frictional abrasion for making said blanks into round disks.

Des Moines, Iowa, November 27, 1916.

HARRY H. KNOTT.
CARL J. JUNGBLUTH.
EDWIN B. HAMMER.